United States Patent [19]

Johansen, Jr. et al.

[11] Patent Number: 5,846,315
[45] Date of Patent: *Dec. 8, 1998

[54] METHOD FOR PREPARING A PIGMENTED DISPERSING PIGMENT CEMENT COMPOSITION

[75] Inventors: Charles J. Johansen, Jr., Katy; Ernest D. Hollas, Weimar; Robert L. Vecchio, Spring; Hani Zoumut, Houston, all of Tex.

[73] Assignee: C-Cure Corporation, Houston, Tex.

[*] Notice: The term of this patent shall not extend beyond the expiration date of Pat. No. 5,558,708.

[21] Appl. No.: 908,449

[22] Filed: Aug. 7, 1997

Related U.S. Application Data

[63] Continuation of Ser. No. 625,894, Apr. 1, 1996, abandoned, which is a continuation-in-part of Ser. No. 438,781, May 11, 1995, Pat. No. 5,558,708.

[51] Int. Cl.$^6$ .......................... C04B 14/00; C04B 14/36
[52] U.S. Cl. ..................... 106/712; 106/724; 106/729; 106/802; 106/819; 106/823; 106/711; 106/401; 106/499; 106/501.1; 106/737; 106/738; 106/709; 523/171
[58] Field of Search .................................. 106/712, 709, 106/711, 710, 724, 718, 729, 720, 721, 802, 803, 819, 823, 708, 499, 401, 501.1, 737, 738; 524/2, 650; 523/160, 171

[56] References Cited

U.S. PATENT DOCUMENTS

| | | |
|---|---|---|
| 1,910,419 | 5/1933 | Amon . |
| 3,667,976 | 6/1972 | Tanner . |
| 3,670,785 | 6/1972 | Heiss et al. . |
| 4,020,040 | 4/1977 | Kattoh et al. . |
| 4,204,876 | 5/1980 | Bowden . |
| 4,335,065 | 6/1982 | Ando . |
| 4,443,567 | 4/1984 | Sternisa et al. . |
| 4,495,228 | 1/1985 | Cornwell . |
| 4,597,997 | 7/1986 | Weill . |
| 4,668,560 | 5/1987 | Kobayashi et al. . |
| 4,717,016 | 1/1988 | Dalgleish . |
| 4,741,781 | 5/1988 | De Witte . |
| 4,792,236 | 12/1988 | Heinis et al. . |
| 4,813,000 | 3/1989 | Wyman et al. . |
| 4,859,504 | 8/1989 | Rossiter et al. . |
| 4,911,642 | 3/1990 | Knowles . |
| 4,946,505 | 8/1990 | Jungk . |
| 5,120,367 | 6/1992 | Smith et al. . |
| 5,199,986 | 4/1993 | Kröckert et al. . |
| 5,224,595 | 7/1993 | Sugimoto et al. . |
| 5,362,322 | 11/1994 | Johansen, Jr. et al. . |
| 5,558,708 | 9/1996 | Johansen, Jr. et al. . |

FOREIGN PATENT DOCUMENTS

| | | |
|---|---|---|
| 0445653 | 9/1991 | European Pat. Off. . |
| 0460744 | 12/1991 | European Pat. Off. . |
| 3709909 | 11/1989 | Germany . |
| 1078723 | 8/1967 | United Kingdom . |
| 2065692 | 7/1981 | United Kingdom . |
| 2085463 | 4/1982 | United Kingdom . |
| 2183626 | 6/1987 | United Kingdom . |
| WO9212102 | 7/1992 | WIPO . |

OTHER PUBLICATIONS

C–Cure Product Brochure for ColorCure 945, Grout Admixture no date.
C–Cure Product Brochure for Supreme 925, Dry Set Grout no date.
C–Cure Product Brochure for AR Grout 922, Commercial Sanded Grout no date.
C–Cure Product Brochure for SuperWhite 927, Nonsanded "Wet Tile" Grout no date.
C–Cure Product Brochure for MP Grout Nonsanded 923, Latex Modified Grout no date.
C–Cure Product Brochure for PM Smooth Finish® Cementitious Finish no date.
Air Products' Technical Data Sheet for Airbond® CP67 Dev Emulsion Cement Modifier no date.
Rohm and Haas' RHOPLEX® MC–76 Product Brochure ©1986 no month.
Dow Latex 460 Product Brochure, Feb. 1987.
Technical Bulletin for Rovene® 4040 Product Brochure, Oct. 1995.
Materials and Methods Standards Association Bulletin No. 14, Oct. 1, 1986.
C–Cure® Catalog, ©1988 no month.
Rohm and Haas' RHOPLEX® E–330 Product Brochure, ©1990 no month.
Acrylic Modifiers for Cement "Resin Review" 1974 vol. XXIV, No. 2 no month.
Acrylic Latex Modified Portland Cement, Joseph A. Lavelle, Presented at American Concrete Institute's 1986 Convention no month.
Rohm and Haas' Brochure entitled "Cement Modifiers and Bond Coats" no date.
Materials and Methods Standards Association Bulletin No. 9, Mar. 15, 1984.
Ceramic Tile Institute, "Field Reports", Chapter 11 no date.
National Tile Contractor's Association, Inc., Inconsistent Grout Color Chart no date.
Abstract of Japanese Patent Application JP 58055356 no date.
Abstract of French Patent 2,661,684 no date.

*Primary Examiner*—Michael Marcheschi
*Attorney, Agent, or Firm*—Hedman, Gibson & Costigan, P.C.

[57] ABSTRACT

An aqueous composition for coloring cement based compositions comprising water, pigment, a suspension enhancing agent and latex polymer solids.

9 Claims, No Drawings

METHOD FOR PREPARING A PIGMENTED DISPERSING PIGMENT CEMENT COMPOSITION

The present application is a continuation of U.S. Ser. No. 08/625,894 filed Apr. 1, 1996, now abandoned, which is a continuation-in-part of application Ser. No. 08/438,781, filed May 11, 1995, now U.S. Pat. No. 5,558,708, issued Sep. 24, 1996.

FIELD OF THE INVENTION

This invention relates to a composition, a method and a system for uniformly dispersing pigment in cement based compositions such as mortars and grouts. More specifically, the invention relates to a multi component system comprising a predetermined quantity of a cement based component and a predetermined amount of an aqueous pigment component. The mixture of the two components results in a cement based composition of uniform and standardized color that is capable of being consistently reproduced if additional material is needed for a particular job.

BACKGROUND OF THE INVENTION

Cement based compositions have found broad use as grouts and mortars. In particular, cement based compositions have been used for setting and grouting tile, for stuccos, for floor leveling and for patching mortars.

The addition of pigments or dyes to cement based compositions is well known in the art. For example, U.S. Pat. No. 4,204,876 teaches a pigment containing thixotropic slurry that can be stored in drums for 6–12 months by a cement contractor and used in a batching system. See also: U.S. Pat. No. 5,199,986, U.S. Pat. No. 3,667,976, U.S. Pat. No. 4,946,505, United Kingdom Patent No. 2,183,626, German Patent No. 3,709,909 and WO 92/12102 which are incorporated herein by reference and generally describe pigmented cement compositions. Traditionally, the addition of dyes or pigments to cement based compositions have been directed to large scale applications where highly sophisticated measuring devices have been available to insure correct color uniformity and shading.

Pigmented or colored cement based compositions such as grout, mortars and stuccos have been gaining popularity because they provide unique and distinctive appearances to various projects. In particular, colored cement compositions have gained popularity for small scale projects such as residential kitchens and baths.

Unfortunately, these small customized color cement composition projects are limited because the laborer does not have access to sophisticated measuring devices which can be used to consistently produce various quantities of the cement based compositions with a uniform color. More importantly, retailers and distributors will not stock a wide variety of colored mortars, grouts and stuccos because demand for a particular color or shade is not great enough to justify the large volume of shelf and storage space required to provide a full spectrum of colors and shades.

Therefore, it is an object of the present invention to provide a multi-component system and method that can consistently produce a cement based composition with a uniform color without the need for sophisticated measuring equipment.

It is a further object of the present invention to provide a multi-component system that can consistently produce a cement based composition with a uniform color which will allow a retailer or distributor to stock a full spectrum of colors and shades of cement based compositions, with minimum shelf space.

A further objective of the present invention is to provide a multi-component system and method that can consistently produce a cement based composition with a uniform color which has little or no volatile organic components which can be emitted.

It is still a further objective of the present invention to provide an aqueous based pigment composition with a prolonged shelf life and which can be easily added to a dry cement based composition without the need of additional water or property enhancing components.

SUMMARY OF THE INVENTION

These and other objects of the present invention are achieved by a multi-component system comprising a predetermined amount of a cement based component and a predetermined amount of an aqueous based pigment component. The predetermined amounts of the cement component and the aqueous component eliminate the need for measuring equipment to be used on the job site and enables the user to obtain a consistent color throughout the job even if additional batches of cement need to be mixed.

The cement component and the aqueous component are mixed together to produce a final composition that can be used in any application where cement based compositions have typically been used such as for grouting and setting of tile, as a mortar or as a stucco.

The cement based component of the present invention comprises cement and optionally other conventional additives such as inert fillers. The conventional additives may be added as a separate component in the system but it is preferred that the fillers be premixed and prepackaged with the cement based component to insure consistent color reproduction.

The aqueous component of the present invention comprises about 50 to about 96 weight percent water based on the total weight of the aqueous component and about 0.01 to about 35 weight percent pigment based on the total weight of the aqueous component. In a preferred embodiment the aqueous component comprises about 70 to about 96 weight percent water based on the total weight of the aqueous component and about 0.01 to about 20 weight percent pigment based on the total weight of the aqueous component.

Some of the preferred pigments are described in U.S. Pat. No. 5,362,322 and are incorporated herein by reference. Other preferred pigments are available from Harcross Pigments, Inc., Bayer Corporation, Reckitts Colour Ltd., or DuPont Corp. and are described in greater detail below.

It is preferred that the aqueous component also comprise: about 0.5 to about 10 weight percent of a suspension enhancing agent; about 0.5 to about 10 weight percent of a latex additive; optionally about 0.05 to about 10 weight percent of a setting aid such as $CaCl_2$; and optionally about 0.01 to about 5 weight percent of dispersant. The foregoing weight percentages are based on the total weight of the aqueous component.

DETAILED DESCRIPTION OF THE INVENTION

The cement of the cement component is preferably Type I Portland cement but other types of Portland cement and/or other types of cements such as aluminious cement, Portland blast furnace slag cement or Portland pozzolan cement may also be used.

Preferably, the cement component comprises either white Portland cement or gray Portland cement. Most preferably, the cement based component is a grout powder commercially available from C-Cure Corp. of Houston, Tex. under the tradename CUREPERFECT™ GROUT BASE, a mortar commercially available from C-Cure Corp. of Houston, Tex. under the tradename AC-CENT™ or a cement finish commercially available from C-Cure Corp. of Houston, Tex. under the tradenames PM SMOOTH FINISH and EXTERIOR STUCCO.

The cement component may comprise inert fillers. The fillers that may be used comprise aggregate filler, fine filler or a combination of aggregate and fine fillers. The inert filler additive may be silica sand, limestone, perlite, volcanic aggregate, alumina trihydrate, ground quartz, volcanic ash, fine sand, talc, mica, clays, calcium carbonate marble dust, other clean inert material or mixtures of the foregoing. The inert filler of the cement component may comprise one, or a combination of the above-identified clean inert materials. The ultimate criteria of the inert filler is that it be graded with not more than about 10 percent passing a number 140 sieve and none retained on a number 6 sieve, as well as having a AFS Grain Fineness Number (American Foundry Society) of not less than 100 but greater than 20.

The pigments that are incorporated into the aqueous component are preferably dry or powder pigments such as iron oxide, natural burnt umber, carbon black, chromium oxide, ultra marine blue and titanium dioxide and are commercially available from Harcross Pigments, Inc., Bayer Corporation, Reckitts Colour Ltd. and DuPont Corp. Liquid pigments may also be used in the present invention. If a liquid pigment is used it should be capable of being dispersed in water, solvent free, unaffected by temperature ranges of 250° F. to 850° F. and stable in alkaline solutions.

The latexes which are employed in the aqueous component of the present invention are commonly dispersions or emulsions of rubbers, epoxies, acrylic resins or acetates. The preferred latexes of the present invention are selected from the group consisting of butadiene rubbers, styrene based polymers and copolymers, acrylic based polymers and copolymers, polyvinyl acetates and any combination of the foregoing.

Some of the more preferred latex additives for the aqueous component are anionic and non anionic dispersions such as styrene, butadiene rubber or acrylics such as: DOW Latex 460 commercially available from Dow Chemical Corp.; 4040 SBR Latex commercially available from Ameripol Synpol Corp.; Rhoplex MC-76 commercially available from Rohm and Haas Company; AIRBOND® CP67 commercially available from Air Products Corp; and ACRONAL 2967 commercially available from BASF Corporation.

The suspension enhancing agent of the aqueous component of the present invention is a substance that decreases the settling of the aqueous component and thereby aids in the stabilization of the aqueous component. Some of the preferred suspension enhancing agents are cellulose ethers such as, methyl cellulose, hydroxyethyl cellulose, sodium carboxymethyl hydroxyethyl cellulose, animal glues, starches such as corn, wheat, or potato, alginates, polyvinyl alcohols, proteins, gums such as gum arabic, gum guar, locust bean gum and clays such as montmorillonite, kaolinite, hectorite and smectite and any combination of the foregoing. Especially preferred suspension enhancing agents are METHOCEL K-100 methyl cellulose, METHOCEL 240 S hydroxypropyl methyl cellulose, both are commercially available from Dow Chemical Co. and attapulgite clay of the type commercially available from Engelhard Minerals Co., under the tradename ATTAGEL 40.

The setting aid, which is optionally employed in the aqueous component of the present invention is a substance that causes the cement composition to cure faster, harder and/or prevent efflorescence. The most common setting aids are salts that provide free calcium ions to the aqueous component. Some of the more preferred setting aids are calcium chloride, calcium sulfate, calcium formate and calcium stearate.

It is also desirable that the aqueous component of the present invention comprise a dispersant or a surfactant to aid in the uniform distribution of the pigment throughout the aqueous medium. Fatty amines, alkylamines, ethylene oxide condensates, or sulfonated soaps may be used as the dispersant. The most preferred dispersants are anionic or nonionic surfactants.

The preferred nonionic surfactants are TRITON X-100, TERGITOL NP9, TRITON N-101 and TRITON CF-10 all commercially available from Union Carbide Co., and MAKON 10 commercially available from Stepan Chemical Co. The preferred anionic surfactants are TRITON X-200 commercially available from Union Carbide Co.; BIOSOFT D-60 commercially available from Stepan Chemical Co.; and DOWFAX 2A1, DOWFAX 3B2, DOWFAX XDS 8292.00 and DOWFAX XDS 8390.00 which are disulfonates commercially available from Dow Chemical Company.

Either the cement component or the aqueous component of the present invention may also further comprise conventional property enhancing additives such as latexes, liquefiers, reinforcing fibers, preservatives, antifoaming agents, thixotropy and viscosity control agents, plasticizers and other miscellaneous additives commonly known in the art. These property enhancing additives are present in amounts commonly known in the industry. The enhancing additives may also be added to the present invention as a separate and distinct component or components which will allow the final cement product to be further customized for a particular application. For example, an acrylic copolymer dispersion of an acrylic ester and styrene may be premixed and prepackaged with the cement based component, aqueous pigment component or a separate component to impart elastomeric properties to the final composition.

In addition to the dispersants already described, additional dispersant aids for both the cement component and the aqueous component include sodium naphthalene sulfates, sulphonated melamines, or melamine formaldehyde condensate. An especially preferred dispersant aid for the cement based component is MELMENT commercially available from SKW Chemicals, Inc.

Reinforcing fibers for either the cement component or the aqueous component are chopped fiberglass or polyethylene fibers. Especially preferred fibers are Wollanstonite reinforcing fibers commercially available from the James River Corporation.

Preferred preservatives for either the cement component or the aqueous component may be COSAN N 101 commercially available from CasChem, DOWACEL 75 commercially available from Dow Chemical Co., NUOSEPT 95 commercially available from Huls America Co. or TROYSAN 174 commercially available from Troy Chemical Co.

Preferred antifoaming agents for the cement component or the aqueous component are ANTIFOAM B commercially available from Dow Corning Silicon, GE 75 commercially available from General Electric Company, SAG 10 commercially available from Union Carbide or NOPCO NXZ or NDW both commercially available from Henkel Co.

The other miscellaneous enhancing additives which may be used are ethylene glycol, propylene glycol, neopentyl glycol, vermiculite, chlorinated paraffins, bromine compounds, and sodium stearate. These miscellaneous additives are used to improve freeze thaw stability, accelerate setting, prevent shrinkage, efflorescence or sagging, flame retardancy or hydrophobic properties of the final cement product. It is possible that these additives can also be used as setting aids which are described above.

The multi-component system of the present invention is particularly useful on actual job sites to consistently and repeatedly produce small quantities of a cement based composition with uniform color. A cement based composition in accordance with the present invention is prepared on the job site by either mixing by hand or mechanical mixer a predetermined and preferably prepackaged amount of the cement based powder component with a predetermined and preferably prepackaged amount of the aqueous pigment component. This embodiment would not require additional water or additives because all the required elements for a particular shade of cement, mortar, stucco or grout would be contained within either the predetermined and prepackaged amount of the cement based component or the predetermined and prepackaged amount of the aqueous component.

In an alternative embodiment, additional amounts of water may be added to bring the cement, mortar, stucco or grout mixture to the proper consistency for application. If additional water is required, it is preferred that the empty container in which the aqueous pigment component was packaged be used to precisely measure the volume of additional water.

Once one batch of the colored cement, mortar, stucco or grout is depleted, a second or additional batches of the colored cement, mortar, stucco, or grout can be prepared from the present invention as described above. The second or additional batches will have the same color and shade as the original batch.

A preferred embodiment of the cement component of the present invention comprises: approximately 20–60 weight percent, preferably 30–50 weight percent, of a white Portland type I cement, approximately 40–75 weight percent, preferably 55 to 70 weight percent of an inert filler and other conventional property enhancing additives such as dipsersants, setting agents and latexes.

In an especially preferred embodiment of the aqueous component of the present invention, the aqueous component comprises: about 80 to about 94 weight percent water; about 0.1 to about 15 weight percent of a pigment; about 1 to about 3 weight percent of a suspension enhancing agent; about 1 to about 10 weight percent of a latex polymer solid; and about 0.05 to about 1 weight percent of a dispersant. The foregoing weight percentages are based upon the total weight of the aqueous component. The recited ranges for the water in the aqueous component include the water in which the latex polymer is usually dispersed.

The aqueous component may further comprise: about 0.1 to about 5 weight percent of a setting aid; about 0.01 to about 2 weight percent of an antifoaming agent; about 0.1 to about 5 weight percent of a glycol to enhance the freeze thaw stability of the liquid component; and an effective amount of a preservative for the aqueous component. All the foregoing weight percentages are based on the total weight of the aqueous component.

Although the applicants do not wish to be limited to a particular theory, it is believed that the combination of the suspension Enhancing agent and latex components of the preferred aqueous composition create a synergistic effect that increases the shelf life of the aqueous component and retards separation of the individual components of the aqueous component. More importantly the combination of the suspension enhancing agent and the latex component "softens" any separation of the individual components such as the pigment, so that any component which settles can be easily redispersed throughout the aqueous component by gentle agitation or shaking of the aqueous component.

DETAILED DESCRIPTION OF A PREFERRED EMBODIMENT

The present invention will be described in detail by reference to the following examples which are provided for illustrative purposes. The following examples should not be construed as limiting the invention. Many variations which do not depart from the spirit or scope of the present invention will suggest themselves to those skilled in the art. All such obvious modifications are within the intended scope of the invention.

PREPARATION 1

A cement based component is prepared by mixing 35 lbs of white Portland cement, 63.95 lbs of fine silica sand exhibiting a 50–70 mesh, 1 lb of clay commercially available from the Kentucky-Tennessee Clay Co. under the tradename ALLAN A. F., and 0.05 lbs of poly vinyl alcohol commercially available from Air Products under the tradename 540. The components are mixed in a ribbon type blender for approximately 10 minutes.

PREPARATION 2

A cement based component is prepared by the procedure described for Preparation 1 except that 35 lbs of grey Portland cement is used instead of the white portland cement.

PREPARATION 3

A cement based component is prepared by mixing 50 lbs of white Portland cement, 49.65 lbs of limestone exhibiting approximately a 325 mesh value commercially available from Georgia Marble Co. under tradename No. 9 WHITE, 0.05 lbs of a polyvinyl alcohol commercially available from Air Products under the tradename 540, and 30 lbs of hydroxypropyl methyl cellulose, commercially available from Dow Chemical Co. under the tradename METHOCEL 240 S. The components are mixed in a ribbon type blender for approximately 10 minutes.

PREPARATION 4

A cement based component is prepared by the procedure described for Preparation 3 except that 50 lbs of grey Portland cement is used instead of the White Portland cement.

PREPARATION 5

A one pint aqueous pigment component is prepared by adding 0.814 lbs of water and 0.204 lbs Dow 460 latex to a tank and mixing the water and latex in a Cowles type disperser at 200 rpms. While the water and latex are mixing, 0.003 lbs of Dow Corning Silicon Antifoam B and 0.010 lbs of Union Carbide's non ionic surfactant Triton X-100 are added. After the antifoaming agent and surfactant are added, 0.086 lbs of calcium chloride which is approximately 77% flake, commercially available from Dow Chemical Co. under the tradename DOWFLAKE is added to the mixture.

Once the calcium chloride is dissolved in the mixture, the speed of the mixer is increased to 2000 rpms and 0.093 lbs of an attapulgite clay, commercially available from Engelhard Minerals Co. under the tradename ATTAGEL 40 Is added to the mixture. After a smooth consistency to the mixture is obtained, 0.001 lbs of Troysan 174 is slowly added followed by 0.161 lbs of yellow oxide commercially available from Harcross Pigments, Inc. under the tradename YO 2087, 0.003 lbs of red oxide commercially available from Harcross Pigments, Inc. under the tradename RO3097 and finally 0.024 lbs of black oxide commercially available from Harcross Pigments, Inc. under the tradename BK-5099.

The mixing continues at high speed until a lump free mixture is obtained with a Hegman grind of 6–7.

PREPARATION 6

A one pint aqueous pigment component is prepared by adding 0.758 lbs of water and 0.204 lbs Dow 460 latex to a tank and mixing the water and latex in a Cowles type disperser at 200 rpms. While the water and latex are mixing, 0.003 lbs of Dow Corning Silicon Antifoam B and 0.010 lbs of Union Carbide's non ionic surfactant Triton X-100 are added. After the antifoaming agent and surfactant are added, 0.086 lbs of calcium chloride which is approximately 776 flake, commercially available from Dow Chemical Co. under the tradename DOWFLAKE is added to the mixture.

Once the calcium chloride is dissolved in the mixture, the speed of the mixer is increased to 2000 rpms and 0.093 lbs of an attapulgite clay, commercially available from Engelhard Minerals Co. under the tradename ATTAGEL 40 is added to the mixture. After a smooth consistency of the mixture is obtained, 0.001 lbs of Troysan 174 is slowly added followed by 0.32 lbs of yellow oxide commercially available from Harcross Pigments Inc. under the tradename YO 2087, 0.104 lbs of red oxide commercially available from Harcross Pigments, Inc., under the tradename RO3097 and finally 0.108 lbs black oxide commercially available from Harcross Pigments, Inc., under the tradename BK-5099.

The mixing continues at high speed until a lump free mixture is obtained with a Hegman grind of 6–7.

PREPARATION 7

A one pint aqueous pigment component is prepared by adding 0.903 lbs of water and 0.204 lbs of Dow 460 latex to a tank and mixing the water and latex in a Cowles type disperser at 200 rpms. While the water and latex are mixing, 0.003 lbs of Dow Corning Silicon Antifoam B and 0.010 lbs of Union Carbide's non ionic surfactant Triton X-100 are added. After the antifoaming agent and surfactant are added, 0.086 lbs of calcium chloride which is approximately 77 flake, commercially available from Dow Chemical Co. under the tradename DOWFLAKE is added to the mixture.

Once the calcium chloride is dissolved in the mixture, the speed of the mixer is increased to 2000 rpms and 0.093 lbs of an attapulgite clay, commercially available from Engelhard Minerals Co. under the tradename ATTAGEL 40 is added to the mixture. After a smooth consistency for the mixture is obtained 0.001 lbs of Troysan 174 is slowly added followed by 0.099 lbs of black oxide commercially available from Harcross Pigments, Inc. under the tradename BK-5099.

The mixing continues at high speed until a lump free mixture is obtained with a Hegman grind of 6–7.

EXAMPLE 1

A cement based composition in accordance with the present invention is prepared by pouring the aqueous pigment component of Preparation 5 into a mixing container. After the aqueous pigment component is added to the mixing container, one pint of water is added to the pint jar which held the aqueous pigment component. The pint of water is stirred in the jar and then poured into a mixing container. The water addition and stirring step is repeated until a total of three pints of water and one pint of the aqueous pigment component are in the mixing container. This repeated rinsing of the aqueous pigment component jar with water assures that all of the pigment is removed from the jar and is present in the mixing container.

After the aqueous pigment and water are in the mixing container small amounts of the cement based component of Preparation 1 are added to the mixing container and mixed by hand or with a low rpm power mixer until 25 lbs of Preparation 1 have been added and a uniform mixture with no color streaks has been obtained. The resulting composition is a grout composition with uniform and consistently reproducible sandstone color.

EXAMPLE 2

A cement based composition in accordance with the present invention is prepared by mixing the aqueous pigment component of Preparation 6 with 25 lbs of the cement based component of Preparation 2 according to the procedure outlined in Example 1. The resulting composition is a grout with uniform and consistently reproducible russet color.

EXAMPLE 3

A cement based composition in accordance with the present invention is prepared by mixing the aqueous pigment component of Preparation 7 with 25 lbs of the cement based component of Preparation 2 according to the procedure outlined in Example 1. The resulting composition is a grout with uniform and consistently reproducible grey color.

EXAMPLE 4

A cement based composition in accordance with the present invention is prepared by pouring the aqueous pigment component of Preparation 5 into a mixing container. After the aqueous pigment component is added to the mixing container, one pint of water is added to the pint jar which held the aqueous pigment component. The pint of water is stirred in the jar and then poured into a mixing container. The water addition and stirring step is repeated until a total of five pints of water and one pint of the aqueous pigment component are in the mixing container. This repeated rinsing of the aqueous pigment component jar with water assures that all of the pigment is removed from the jar and is present in the mixing container.

After the aqueous pigment and water are in the mixing container, small amounts of the cement based component of Preparation 3 are added to the mixing container and mixed by hand or with a low rpm power mixer until 25 lbs of Preparation 3 have been added and a uniform mixture with no color streaks has been obtained. The resulting composition is a non sanded grout composition with uniform and consistently reproducible light sandstone color.

EXAMPLE 5

A cement based composition in accordance with the present invention is prepared by mixing the aqueous pigment component of Preparation 6 with 25 lbs of the cement based component of Preparation 4 according to the procedure outlined in Example 1. The resulting composition is a non sanded grout with uniform and consistently reproducible light russet color.

Preparations 5–7 exhibit a viscosity of about 8000 cps (centipoise) to about 12000 cps and most preferably from about 9500 cps to about 10500 cps as determined by ASTM D2196-86 and exhibit a Hegman grind of about 4 to about 8 and most preferably from about 6 to about 7 as determined by ASTM D-1210-79.

PREPARATION 8

A one gallon aqueous pigment component is prepared by first preparing a pigment base. The pigment base is prepared by adding 2.5062 lbs of water; 0.1567 lbs of an attapulgite clay, commercially available from Engelhard Minerals Co. under the tradename ATTAGEL 40; 0.6809 lbs of BU 5250 pigment (a burnt umber); and 0.1356 lbs of BK 5099 pigment (black), both pigments are commercially available from Harcross Pigments, Inc., to a Cowles or Schold type high speed disperser and grinding the water, clay and pigment for approximately 15 minutes or until a Hegman grind of 6–7 is obtained.

While the water, clay and pigment are being ground, an aqueous carrier solution is prepared by mixing: 0.3063 lbs of Rovene® 4040 Latex commercially available from Ameripol Synpol Corporation; 0.0817 lbs of propylene glycol; 0.028 lbs of Troysan 174, a preservative commercially available from Troy Chemical Co.; 0.0143 lbs of Dow Corning Silicon Antifoam B; and 0.4437 lbs of water in a Paddle type mixer at 200 rpms for about 10 minutes. While the water and latex are mixing, 4.6166 lbs of water, 0.0928 lbs of calcium chloride which is approximately 77% flake, commercially available from Dow Chemical Co. under the tradename DOWFLAKE, 0.0102 lbs of an anionic surfactant commercially available from Dow Chemical Co. under the tradename DOWFAX 3B2 and 0.0009 lbs of Dow Corning Silicon Antifoam B are added to the mixer and mixed for approximately 10 minutes at 200 rpms.

Once the calcium chloride is dissolved in the mixture, the speed of the mixer is increased to 750 rpms and the pigment base is added to the mixture. The mixing continues until a lump free mixture is obtained.

The resulting composition is a one (1) gallon aqueous component in accordance with the present invention which comprises about 85.3 weight percent water (including the water from the Rovene® 4040 dispersion, about 1.7 weight percent of a suspension enhancing agent, about 9.0 weight percent pigment and about 1.693 weight percent of Rovene® latex polymer solids. The foregoing weight percentages are based on the total weight of the one gallon aqueous component.

The one (1) gallon aqueous component prepared in accordance with Preparation 8 can be added to 35 lbs of the sanded CUREPERFECT™ cement base or 17.5 lbs of the nonsanded CUREPERFECT™ cement base at a job site to consistently produce a light brown grout, which does not require any measuring or additional water.

The one gallon aqueous component prepared in Preparation 8 was measured for settling by ASTM D-869-85. The result of this test is reported in Table 1.

PREPARATION 9

A one gallon aqueous pigment component is prepared according to the procedure outlined in Preparation 8 wherein the pigment base comprises: 1.8796 lbs of water; 0.2193 lbs of an attapulgite clay, commercially available from Engelhard Minerals Co. under the tradename ATTAGEL 40; 0.0271 lbs of Y 6090 pigment a yellow oxide; and 0.0162 lbs of R 3098 pigment a red oxide, both pigments commercially available from Harcross Pigments, Inc.

The aqueous carrier solution comprises: 0.3063 lbs of Rovene® 4040 Latex commercially available from Ameripol Synpol Corporation; 0.0817 lbs of propylene glycol; 0.025 lbs of Troysan 174, a preservative commercially available from Troy Chemical Co.; 0.0152 lbs of mow Corning Silicon Antifoam B; 5.880 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component in accordance with the present invention which comprises approximately 92.8 weight percent water including the water from the Rovene® 4040 dispersion, approximately 2.6 weight percent of a suspension enhancing agent, approximately 0.51 weight percent pigment and approximately 1.8 weight percent of Rovene® latex polymer solids. The foregoing weight percentages are based on the total weight of the one gallon aqueous component.

The one (1) gallon aqueous component prepared in accordance with Preparation 9 can be added to 35 lbs of the sanded CUREPERFECT™ cement base or 17.5 lbs of the nonsanded CUREPERFECT™ cement base at a job site to consistently produce a peach colored grout, which does not require any measuring or additional water.

The one gallon aqueous component prepared in Preparation 9 was measured for settling by the method described in Preparation 8. The result of this test is reported in Table 1.

PREPARATION 10

A one gallon aqueous pigment component is prepared according to the procedure outlined in Preparation 8 wherein the pigment base comprises: 1.8796 lbs of water; 0.2189 lbs of an attapulgite clay, commercially available from Engelhard Minerals Co. under the tradename ATTAGEL 40; 0.2987 lbs of Y 6090 pigment; 0.0484 lbs of BK 5099 pigment; and 0.0484 lbs of R 3098 pigment, all pigments commercially available from Harcross Pigments, Inc.

The aqueous carrier solution comprises: 0.3063 lbs of Rovene® 4040 Latex commercially available from Ameripol Synpol Corporation; 0.0817 lbs of propylene glycol; 0.025 lbs of Troysan 174, a preservative commercially available from Troy Chemical Co.; 0.0152 lbs of Dow Corning Silicon Antifoam B; 5.721 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component in accordance with the present invention which comprises approximately 88.88 weight percent water (including the water from the Rovene® 4040 dispersion), approximately 2.5 weight percent of a suspension enhancing agent, approximately 4.5 weight percent pigment and approximately 1.8 weight percent of Rovene® latex polymer solids. The foregoing weight percentages are based on the total weight of the one gallon aqueous component.

The one (1) gallon aqueous component prepared in accordance with Preparation 10 can be added to 35 lbs of the sanded CUREPERFECT™ cement base or 17.5 lbs of the nonsanded CUREPERFECT™ cement base at a job site to consistently produce an adobe colored grout, which does not require any measuring or additional water.

The one gallon aqueous component prepared in Preparation 10 was measured for settling by the method described in Preparation 8. The result of this test is reported in Table 1.

PREPARATION 11

A one gallon aqueous pigment component is prepared according to the procedure outlined in Preparation 8 wherein the pigment base comprises: 1.8796 lbs of water; 0.2162 lbs of an attapulgite clay, commercially available from Engelhard Minerals Co. under the tradename ATTAGEL 40; and 0.2491 lbs of BK 5099 pigment commercially available from Harcross Pigments, Inc.

The aqueous carrier solution comprises: 0.3063 lbs of Rovene® 4040 Latex commercially available from Ameripol Synpol Corporation; 0.0817 lbs of propylene glycol; 0.025 lbs of Troysan 174, a preservative commercially available from Troy Chemical Co.; 0.0152 lbs of Dow Corning Silicon Antifoam B; 5.811 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component in accordance with the present invention which comprises approximately 90.5 weight percent water including the water from the Rovene® 4040 dispersion, approximately 2.5 weight percent of a suspension enhancing agent, approximately 2.9 weight percent pigment and approximately 1.8 weight percent of Rovene® latex polymer solids. The foregoing weight percentages are based on the total weight of the one gallon aqueous component.

The one (1) gallon aqueous component prepared in accordance with Preparation 11 can be added to 35 lbs of the sanded CUREPERFECT™ cement base or 17.5 lbs of the nonsanded CUREPERFECT™ cement base at a job site to consistently produce a gray colored grout, which does not require any measuring or additional water.

The one gallon aqueous component prepared in Preparation 11 was measured for settling by the method described in Preparation 8. The result of this test is reported in Table 1.

PREPARATION 12

A one gallon aqueous pigment component is prepared according to the procedure outlined in Preparation 8 wherein the pigment base comprises: 2.5061 lbs of water; 0.1566 lbs of an attapulgite clay, commercially available from Engelhard Minerals Co. under the tradename ATTAGEL 40; 0.6777 lbs of BK 5099 pigment; and 0.6681 G 4099 pigment (a green oxide), both pigments commercially available from Harcross Pigments, Inc.

The aqueous carrier solution comprises: 0.3063 lbs of Rovene® 4040 Latex commercially available from Ameripol Synpol Corporation; 0.0817 lbs of propylene glycol; 0.025 lbs of Troysan 174, a preservative commercially available from Troy Chemical Co.; 0.0152 lbs of Dow Corning Silicon Antifoam B; 5.045 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component in accordance with the present invention which comprises approximately 80.6 weight percent water (including the water from the Rovene® 4040 dispersion), approximately 1.6 weight percent of a suspension enhancing agent, approximately 14.1 weight percent pigment and approximately 1.6 weight percent of Rovene® latex polymer solids. The foregoing weight percentages are based on the total weight of the one gallon aqueous component.

The one (1) gallon aqueous component prepared in accordance with Preparation 12 can be added to 35 lbs of the sanded CUREPERFECT™ cement base or 17.5 lbs of the nonsanded CUREPERFECT™ cement base at a job site to consistently produce a dark jade colored grout, which does not require any measuring or additional water.

The one gallon aqueous component prepared in Preparation 12 was measured for settling by the method described in Preparation 8. The result of this test is reported in Table 1.

PREPARATION 13

A one gallon aqueous pigment component is prepared according to the procedure outlined in Preparation 8 wherein the pigment base comprises: 1.8796 lbs of water; 0.2143 lbs of an attapulgite clay, commercially available from Engelhard Minerals Co. under the tradename ATTAGEL 40; and 0.0165 lbs of BK 5099 pigment commercially available From Harcross Pigments, Inc.

The aqueous carrier solution comprises: 0.3063 lbs of Rovene® 4040 Latex commercially available from Ameripol Synpol Corporation; 0.0817 lbs of propylene glycol; 0.025 lbs of Troysan 174, a preservative commercially available from Troy Chemical Co.; 0.0152 lbs of Dow Corning Silicon Antifoam B; 5.951 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component in accordance with the present invention which comprises approximately 93.2 weight percent water (including the water from the Rovene® 4040 dispersion), approximately 2.5 weight percent of a suspension enhancing agent, approximately 0.192 weight percent pigment and approximately 1.8 weight percent of Rovene® latex polymer solids. The foregoing weight percentages are based on the total weight of the one gallon aqueous component.

The one (1) gallon aqueous component prepared in accordance with Preparation 13 can be added to 35 lbs of the sanded CUREPERFECT™ cement base or 17.5 lbs of the nonsanded CUREPERFECT™ cement base at a job site to consistently produce a silver colored grout, which does not require any measuring or additional water.

The one gallon aqueous component prepared in Preparation 13 was measured for settling by the method described in Preparation 8. The result of this test is reported in Table 1.

Comparative Preparation 1

A one gallon aqueous pigment component is prepared according to the procedure outlined in Preparation 8 wherein the pigment base comprises: 1.8796 lbs of water; 0.2143 lbs of an attapulgite clay, commercially available from Engelhard Minerals Co. under the tradename ATTAGEL 40; and 0.0165 lbs of BK 5099 pigment commercially available from Harcross pigments, Inc.

The aqueous carrier solution comprises: 0.0817 lbs of propylene glycol; 0.025 lbs of Troysan 174, a preservative commercially available from Troy Chemical Co.; 0.0152 lbs of Dow Corning Silicon Antifoam B; 6.2573 lbs of water; 0.0928 lbs of calcium chloride which is approximately 77% flake , commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component not in accordance with the present invention which comprises approximately 95 weight percent water, approximately 2.5 weight percent of a suspension enhancing agent, approximately 0.192 weight percent pigment and no latex polymer solids. The foregoing weight percentages are based on the total weight of the one gallon aqueous component.

The one gallon aqueous component prepared in Comparative Preparation 1 was measured for settling by the method described in Preparation 8. The result of this test is reported in Table 1.

Comparative Preparation 2

A one gallon aqueous pigment component is prepared according to the procedure outlined in Preparation 8 wherein the pigment base comprises: 2.5061 lbs of water; 0.1566 lbs of an attapulgite clay, commercially available from Engelhard Minerals Co. under the tradename ATTAGEL 40; 0.6777 lbs. of BK 5099 pigment; and 0.6681 lbs G 4099 pigment, both pigments commercially available from Harcross Pigments, Inc.

The aqueous carrier solution comprises: 0.0817 lbs of propylene glycol; 0.025 lbs of Troysan 174, a preservative commercially available from Troy Chemical Co.; 0.0152 lbs of Dow Corning Silicon Antifoam B; 5.3513 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component not in accordance with the present invention which comprises approximately 81.98 weight percent water, approximately 1.6 weight percent of a suspension enhancing agent, approximately 14.1 weight percent pigment and no latex polymer solids. The foregoing weight percentages are based on the total weight of the one gallon aqueous component.

The one gallon aqueous component prepared in Comparative Preparation 2 was measured for settling by the method described in Preparation 8. The result of this test is reported in Table 1.

Comparative Preparation 3

A one gallon aqueous pigment component is prepared according to the procedure outlined in Preparation 8 wherein the pigment base comprises: 1.8796 lbs of water; 0.2189 lbs of an attapulgite clay, commercially available from Engelhard Minerals Co. under the tradename ATTAGEL 40; 0.2987 lbs of Y 6090 pigment; 0.0484 lbs of BK 5099 pigments; and 0.0484 lbs of R 3098 pigment, all pigments commercially available from Harcross Pigments, Inc.

The aqueous carrier solution comprises: 0.0817 lbs of propylene glycol; 0.025 lbs of Troysan 174, a preservative commercially available from Troy Chemical Co.; 0.0152 lbs of Dow Corning Silicon Antifoam B; 6.0273 lbs of water; 0.0928 lbs of calcium chloride which is approximately 77% flake, commercial available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component not in accordance with the present invention which comprises approximately 90.68 weight percent water, approximately 2.5 weight percent of a suspension enhancing agent:, approximately 4.5 weight percent pigment and no latex polymer solids. The foregoing weight percentages are based on the total weight of the one gallon aqueous component.

The one gallon aqueous component prepared in Comparative Preparation 3 was measured for settling by the method described in Preparation 8. The result of this test is reported in Table 1.

Comparative Preparation 4

A one gallon aqueous pigment component is prepared according to the procedure outlined in Preparation 8 wherein the pigment base comprises: 1.8796 lbs of water and 0.0165 lbs of BK 5099 pigment commercially available from Harcross Pigments, Inc.

The aqueous carrier solution comprises: 0.3063 lbs of Rovene® 4040 Latex commercially available from Ameripol Synpol Corporation; 0.0817 lbs of propylene glycol; 0.025 lbs of Troysan 174, a preservative commercially available from Troy Chemical Co.; 0.0152 lbs of Dow Corning Silicon Antifoam B, 6.1653 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component not in accordance with the present invention which comprises approximately 95.62 weight percent water including the water from the Rovene® 4040 dispersion, approximately 0.192 weight percent pigment and approximately 1.8 weight percent Rovene® 4040 latex polymer solids. The foregoing weight percentages are based on the total weight of the one gallon aqueous component.

The one gallon aqueous component prepared in Comparative Preparation 4 was measured for settling by the method described in Preparation 8. The result of this test is reported in Table 1.

Comparative Preparation 5

A one gallon aqueous pigment component is prepared according to the procedure outlined in Preparation 8 wherein the pigment base comprises: 2.5061 lbs of water; 0.6777 lbs of BK 5099 pigment; and 0.6681 lbs G 4099 pigment, both pigments commercially available from Harcross Pigments, Inc.

The aqueous carrier solution comprises: 0.3063 lbs of Rovene® 4040 Latex commercially available from Ameripol Synpol Corporation; 0.0817 lbs of propylene glycol; 0.025 lbs of Troysan 174, a preservative commercially available from Troy Chemical Co.; 0.0152 lbs of Dow Corning Silicon Antifoam B; 6.0272 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component not in accordance with the present invention which comprises approximately 83.44 weight percent water (including the water form the Rovene® 4040 dispersion), approximately 12.9 weight percent pigment and 1.5 weight percent of Rovene® 4040 latex polymer solids. The foregoing weight percentages are based on the total weight of the one gallon aqueous component.

The one gallon aqueous component prepared in Comparative Preparation 5 was measured for settling by the method described in Preparation 8. The result of this test is reported in Table 1.

Comparative Preparation 6

A one gallon aqueous pigment component is prepared according to the procedure outlined in Preparation 8 wherein the pigment base comprises: 1.8796 lbs of water; C.2987 lbs of Y 6090 pigment; 0.0484 lbs of BK 5099 pigment; and 0.0484 lbs of R 3098 pigment, all pigments commercially available from Harcross Pigments, Inc.

The aqueous carrier solution comprises: 0.3063 lbs of Rovene® 4040 Latex commercially available from Ameripol Synpol Corporation; 0.0817 lbs of propylene glycol; 0.025 lbs of Troysan 174, a preservative commercially available from Troy Chemical Co.; 0.0152 lbs of Dow Corning Silicon Antifoam B; 6.0962 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component not in accordance with the present invention which comprises approximately 91.38 weight percent water including the water from the Rovene® 4040 dispersion, approximately 4.5 weight percent pigment and approximately 1.8 weight percent Rovene® 4040 latex polymer solids. The foregoing weight percentages are based on the total weight of the one gallon aqueous component.

The one gallon aqueous component prepared in Comparative Preparation 6 was measured for settling by the method described in Preparation 8. The result of this test is reported in Table 1.

Comparative Preparation 7

A one gallon aqueous pigment component is prepared according to the procedure outlined in Preparation 8 wherein the pigment base comprises: 1.8796 lbs of water and 0.1920 lbs of BK 5099 pigment commercially available from Harcross Pigments, Inc.

The aqueous carrier solution comprises: 0.0817 lbs of propylene glycol; 0.025 lbs of Troysan 174, a preservative commercially available from Troy Chemical Co.; 0.0152 lbs of Dow Corning Silicon Antifoam B; 6.4716 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component not in accordance with the present invention which comprises approximately 95.25 weight percent water and approximately 2.19 weight percent pigment. The foregoing weight percentages are based on the total weight of the one gallon aqueous component.

The one gallon aqueous component prepared in Comparative Preparation 7 was measured for settling by the method described in Preparation 8. The result of this test is reported in Table 1.

Comparative Preparation 8

A one gallon aqueous pigment component is prepared according to the procedure outlined in Preparation 8 wherein the pigment base comprises: 2.5061 lbs of water; 0.6777 lbs of BK 5099 pigment; and 0.6681 lbs G 4099 pigment, both pigments commercially available from Harcross Pigments, Inc.

The aqueous carrier solution comprises: 0.0817 lbs of propylene glycol; 0.025 lbs of Troysan 174, a preservative commercially available from Troy Chemical Co.; 0.0152 lbs of Dow Corning Silicon Antifoam B; 5.5079 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component not in accordance with the present invention which comprises approximately 83.8 weight percent water and approximately 14.1 weight percent pigment. The foregoing weight percentages are based on the total weight of the one gallon aqueous component.

The one gallon aqueous component prepared in Comparative Preparation 8 was measured for settling by the method described in Preparation 8. The result of this test is reported in Table 1.

Comparative Preparation 9

A one gallon aqueous pigment component is prepared according to the procedure outlined in Preparation 8 wherein the pigment base comprises: 1.8796 lbs of water; 0.2987 lbs of Y 6090 pigment; 0.0484 lbs of BK 5099 pigment; and 0.0484 lbs of R 3098 pigment, all pigments commercially available from Harcross Pigments, Inc.

The aqueous carrier solution comprises: 0.0817 lbs of propylene glycol; 0.025 lbs of Troysan 174, a preservative commercially available from Troy Chemical Co.; 0.0152 lbs of Dow Corning Silicon Antifoam B; 6.2462 lbs of water; 0.0928 lbs of calcium chloride which is approximately 77% flake, commercially available from Dow Chemical Co. under the tradename DOWFLAKE; and 0.0102 lbs of an anionic surfactant commercially available from Dow Chemical Co. under the tradename DOWFAX 3B2.

The resulting composition is a one (1) gallon aqueous component not in accordance with the present invention which comprises approximately 92.91 weight percent water and approximately 4.5 weight percent pigment. The foregoing weight percentages are based on the total weight of the one gallon aqueous component.

The one gallon aqueous component prepared in Comparative Preparation 9 was measured for settling by the method described in Preparation 8. The result of this test is reported in Table 1.

TABLE 1

| | Settle Time | | |
|---|---|---|---|
| | 7 days | 14 days | 6 months |
| Preparation 8 | 10 | 9.5 | 9.5 |
| Preparation 9 | 10 | 9.5 | 9.5 |
| Preparation 10 | 10 | 9.5 | 9.5 |
| Preparation 11 | 10 | 9.5 | 9.5 |
| Preparation 12 | 10 | 9.5 | 9.5 |
| Preparation 13 | 10 | 9.5 | 9.5 |
| Comparative Prep. 1 | 5 | 2 | |
| Comparative Prep. 2 | 5.5 | 2 | |
| Comparative Prep. 3 | 5 | 1 | |
| Comparative Prep. 4 | 5 | 1 | |
| Comparative Prep. 5 | 4.5 | 1 | |
| Comparative Prep. 6 | 4 | 0 | |
| Comparative Prep. 7 | 4 | 0 | |
| Comparative Prep. 8 | 4 | 0 | |
| Comparative Prep. 9 | 4 | 0 | |

10 = no change; 5 = poor stability (much settling); 0–1 = heavy settling (unusable)

The results of Table 1 show that the aqueous components prepared in accordance with the present invention, Preparations 8–13, exhibit a longer settling time than compositions not prepared in accordance with the present invention, Comparative Preparations 1–9.

Preparations 8–13 exhibit a viscosity of about 100 cps (centipoise) to about 1100 cps and most preferably from about 140 cps to about 950 cps as determined by ASTM D2196-86.

In practice, it is preferred that the aqueous pigment component be packaged in a pint or a gallon sized container and the cement based component be packaged in 25 or 35 lb containers to eliminate the need for sophisticated measuring devices on a job site. Other size packaging may also be used such as quart sized containers of the aqueous pigment and 50 lb containers of the cement based component or cup (8 fl. oz.) sized containers of the aqueous pigment and 12.5 lb containers of the cement based component.

It has also been found that the aqueous pigment component such as those described in Preparations 5–7 and 8–13 can be mixed with predetermined and prepackaged amounts of cement based products such as masonry mortars commercially available from C-Cure Corporation of Houston, Tex. under the tradename ACCENT®, cementitious finishes commercially available from C-Cure Corporation under the tradename PM SMOOTH FINISH and stuccos commercially available from C-Cure Corporation under the tradename EXTERIOR STUCCO.

It is also possible to combine predetermined amounts of two or more differently pigmented aqueous components to a predetermined amount of the cement component to create additional color variations for the final cement product. For example, one half gallon of Preparation 9 and one half gallon of Preparation 13 can be added to 35 lbs of the sanded CUREPERFECT™ cement base or 17.5 lbs of the non-sanded CUREPERFECT™ cement base to consistently produce a taupe colored grout, which does not require any measuring or additional water. Such a combination system for consistently preparing a pigmented cement product from two or more differently pigmented aqueous components should preferably employ a combination chart or grid such as the one described in U.S. Pat. No. 5,362,322, which is incorporated herein by reference. The method for preparing a pigmented cement composition that employs the pigment chart comprises the following steps: selecting a color from a color grid having axes with preselected colors; determining the component colors from the axes of the grid corresponding to the selected color; thoroughly mixing two or more prepackaged compositions comprising an aqueous pigment component of the preselected color with a prepackaged amount of a dry powder cement component in a mixing container to obtain a cement composition with a uniform and standardized color.

All the above mentioned patents, publications and test methods are herein incorporated by reference.

We claim:

1. A method for preparing a pigmented cement composition comprising:

selecting a color from a color grid having axes with preselected colors;

determining the component colors from the axes of the grid corresponding to the selected color;

thoroughly mixing two or more prepackaged compositions comprising an aqueous pigment component which combine to create the selected color with a prepackaged amount of a dry powder cement component in a mixing container to obtain a cement composition with a uniform and standardized color.

2. The method of claim 1 wherein the dry powder cement component comprises a portland cement.

3. The method of claim 2 wherein the dry powder component further comprises an inert filler.

4. The method of claim 3 wherein the inert filler comprises one or more materials selected from the group consisting of silica sand, limestone, perlite, volcanic aggregate, alumina trihydrate, ground quartz, volcanic ash, fine sand, talc, mica, clays, and calcium carbonate (marble dust).

5. The method of claim 4 wherein the dry powder component further comprises a polyvinyl alcohol.

6. The method of claim 4 wherein the dry powder component further comprises a methyl cellulose.

7. The method of claim 1 wherein the aqueous pigment component comprises a pigment and water.

8. The method of claim 7 wherein the aqueous component further comprises one or more materials selected from the group consisting of suspension enhancing agents, latex additives, setting aids, antifoaming agents, surfactants, liquefiers, freeze/thaw stabilizers, reinforcing fibers, preservatives, plasticizers, thixotropy and viscosity control agents and dispersants.

9. The method of claim 1 wherein the aqueous pigment component is supplied in two or more packages, each package having a different color pigment.

* * * * *